United States Patent [19]

Elsaesser et al.

[11] 4,117,668

[45] Oct. 3, 1978

[54] STALL DETECTOR FOR GAS TURBINE ENGINE

[75] Inventors: Fred L. Elsaesser, Glastonbury; Joseph H. Hall, East Hartford, both of Conn.

[73] Assignee: United Technologies Corporation, Hartford, Conn.

[21] Appl. No.: 633,310

[22] Filed: Nov. 19, 1975

[51] Int. Cl.² ................................................. F02C 7/22
[52] U.S. Cl. ............................ 60/39.03; 60/39.28 R; 60/39.29; 60/223
[58] Field of Search ................. 60/39.02, 39.03, 39.29, 60/39.27, 39.28 T, 223; 340/27 SS; 73/117.3; 415/27

[56] References Cited

U.S. PATENT DOCUMENTS

| | | | |
|---|---|---|---|
| 3,172,259 | 3/1965 | North | 60/39.29 X |
| 3,395,534 | 8/1968 | Owen | 60/39.29 |
| 3,426,322 | 2/1969 | Balo | 60/39.29 |
| 3,513,899 | 5/1970 | Paduch | 60/39.29 X |
| 3,646,753 | 3/1972 | Colman | 60/39.29 X |
| 3,688,504 | 9/1972 | Hutchinson | 60/39.29 |
| 3,805,517 | 4/1974 | Sewell | 60/223 |
| 3,830,055 | 8/1974 | Erlund | 60/39.28 R |
| 3,849,021 | 11/1974 | Eastman | 60/39.29 X |
| 3,852,958 | 12/1974 | Adams | 60/39.28 R |
| 3,867,717 | 2/1975 | Moehring | 60/39.28 R |
| 3,876,326 | 4/1975 | Weitz | 60/39.29 |

*Primary Examiner*—Robert E. Garrett
*Attorney, Agent, or Firm*—Norman Friedland

[57] ABSTRACT

Stall is detected by monitoring the acceleration schedule of the engine's fuel control and an engine operating parameter, either compressor speed, compressor pressure and computing signals indicative of when both the fuel control is on or near the acceleration schedule and when (1) the compressor speed is decaying at a given rate or (2) compressor discharge or burner pressure is decaying at a given rate or (3) the pressure ratio of low compressor discharge to compressor inlet or burner pressure to compressor inlet is at a predetermined low level, an output signal will be manifested.

28 Claims, 6 Drawing Figures

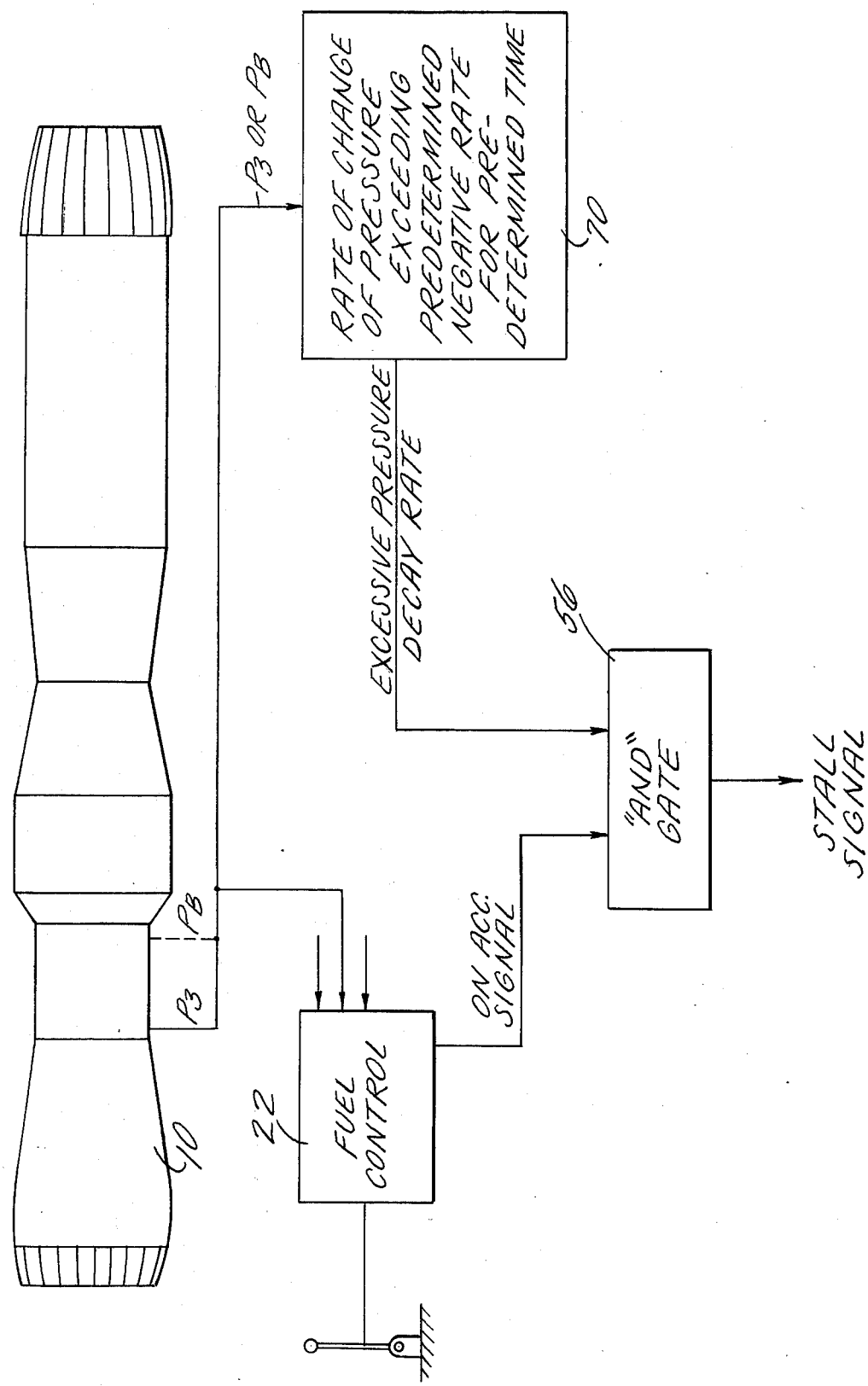

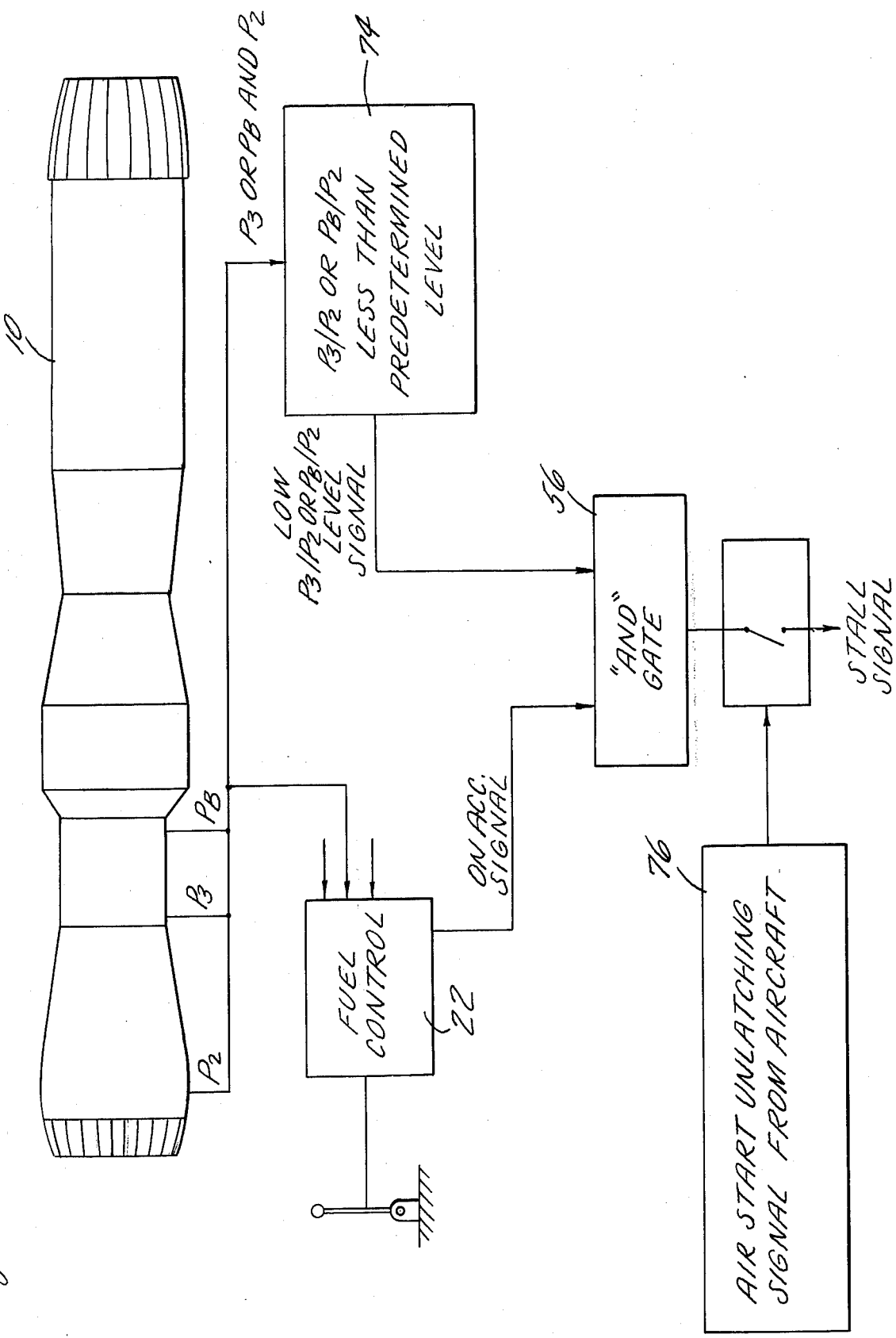

STALL DETECTOR FOR GAS TURBINE ENGINE

BACKGROUND OF THE INVENTION

This invention relates to means for detecting stall in a gas turbine engine and more particularly to a stall detection system that utilizes the existing engine fuel control and its computed parameters.

As is well known, stall is a phenomenon that may occur in the compressor of a gas turbine engine which, if allowed to persist unabated, would impair engine performance and/or lead to the destruction of the engine. While the theory of stall is not completely understood, suffice it to say that stall is that effect occasioned when a sufficient number of compressor blades stall and a momentary reversing of the airflow occurs through the compressor. This causes compressor discharge pressure to drop very rapidly and sometimes results in continual pressure oscillations until some corrective action is taken.

The art has seen a number of methods intended to either sense when stall is imminent and warn the pilot so that he can take corrective action or design the engine controls such that the area of engine operation where stall is likely to occur is avoided.

For example, fuel controls limit the amount of fuel admitted to the engine during acceleration so as to accelerate along a predetermined acceleration schedule that accounts for stall. Another method, which may be contemporaneously employed with this acceleration scheduling system is to measure compressor discharge pressure and open compressor bleed valves whenever a predetermined compressor pressure change or rate of change occurs. And still another method which is described in U.S. Pat. No. 3,867,717 and granted to John Theodore Moehring and Vigil Willis Lawson on Feb. 18, 1975 is the utilization of computed compressor pressures and turbine or exit temperatures as a means for calculating when stall is imminent.

While such stall detection and prevention means as described above may be effective for certain engines and/or their applications they are not always effective for other engines and/or their applications. For example, it may happen that under the same values of the computed compressor pressures or their rates and turbine temperatures or their rates another engine operation may occur which would lead to a false indication of stall; or the monitoring of the parameter may not be readily accessible or the inclusion of the sensing probes may interfere with the gas path and impair engine performance. Therefore the selection of the stall controller comes down to what stall system is best for that engine and its applications, what parameters are readily accessible, which system will provide the highest degree of accuracy, which one is fastest and a host of other considerations.

This invention contemplates monitoring the accelerating schedule which is already in existence and manifested by the fuel control and another engine parameter, namely compressor speed, burner or compressor discharge pressure or their rate of change. In essence, this system takes into account whether or not the fuel control is on the acceleration schedule and whether or not the compressor speed (RPM) is decreasing or not increasing. (In a twin spool engine configuration N may be either the low compressor speed ($N_1$) or the high compressor speed ($N_2$) ). If this occurrence takes place, then, in certain engines stall would ensue. Alternatively, this invention contemplates monitoring the acceleration schedule and $P_b$ (burner pressure) or $P_{S3}$ (static compressor discharge pressure together with compressor inlet pressure ($P_2$) to determine if stall is imminent. In this instance a computer produces an output signal that is proportional to the ratio of $P_3$ to $P_2$ or $P_B$ to $P_2$.

Alternatively, this invention contemplates monitoring $P_B$ or $P_3$ and the acceleration schedule produced by the fuel control and provide a stall warning signal whenever the fuel control is on or in proximity to the acceleration schedule, say up to 3 ratio units away in a $W_f/P_b$ type of control, and the decay rate of $P_3$ or $P_B$ is exceeding a predetermined value.

In any stall control system that senses when stall is imminent the computed stall signal can either be utilized to provide a warning signal to the aircraft pilot, as by a visual or sound signal so that he can take corrective action as by retarding the power lever or the signal can be utilized to initiate corrective action in one of the following ways.
  1. de-rich engine fuel flow
  2. shutoff fuel
  3. open compressor bleeds
  4. change compressor stator vane angle
  5. change aircraft inlet geometry
  6. change engine outlet geometry Furthermore, the signal can be incorporated in a system that would initiate an automatic stall recovery sequence by shutting-off fuel, start ignition and reinitiate fuel flow in a timed sequence.

SUMMARY OF THE INVENTION

An object of this invention is to provide an improved stall warning system for an axial flow gas turbine engine.

A still further object of this invention is to provide a stall warning system that utilizes the acceleration schedule of the engine's fuel control together with another engine operating parameter solely when predetermined conditions of each signal is satisfied.

A still further object of this invention is to provide a stall warning signal upon satisfying the condition that the fuel control is on or in proximity to the acceleration schedule and the pressure ratio across the compressor as measured with compressor discharge pressure or compressor burner pressure is below a predetermined level; or alternatively, the decay rate of $P_3$ or $P_B$ is at a predetermined rate, or alternatively, the decay rate of speed is at a predetermined value.

Other features and advantages will be apparent from the specification and claims and from the accompanying drawings which illustrate an embodiment of the invention.

BRIEF DESCRIPTION OF THE DRAWINGS

FIG. 5 is a schematic representation of another embodiment of a stall warning system, and FIG. 6 is a schematic representation of another embodiment of a stall warning system.

DESCRIPTION OF THE PREFERRED EMBODIMENT

Figure 1:
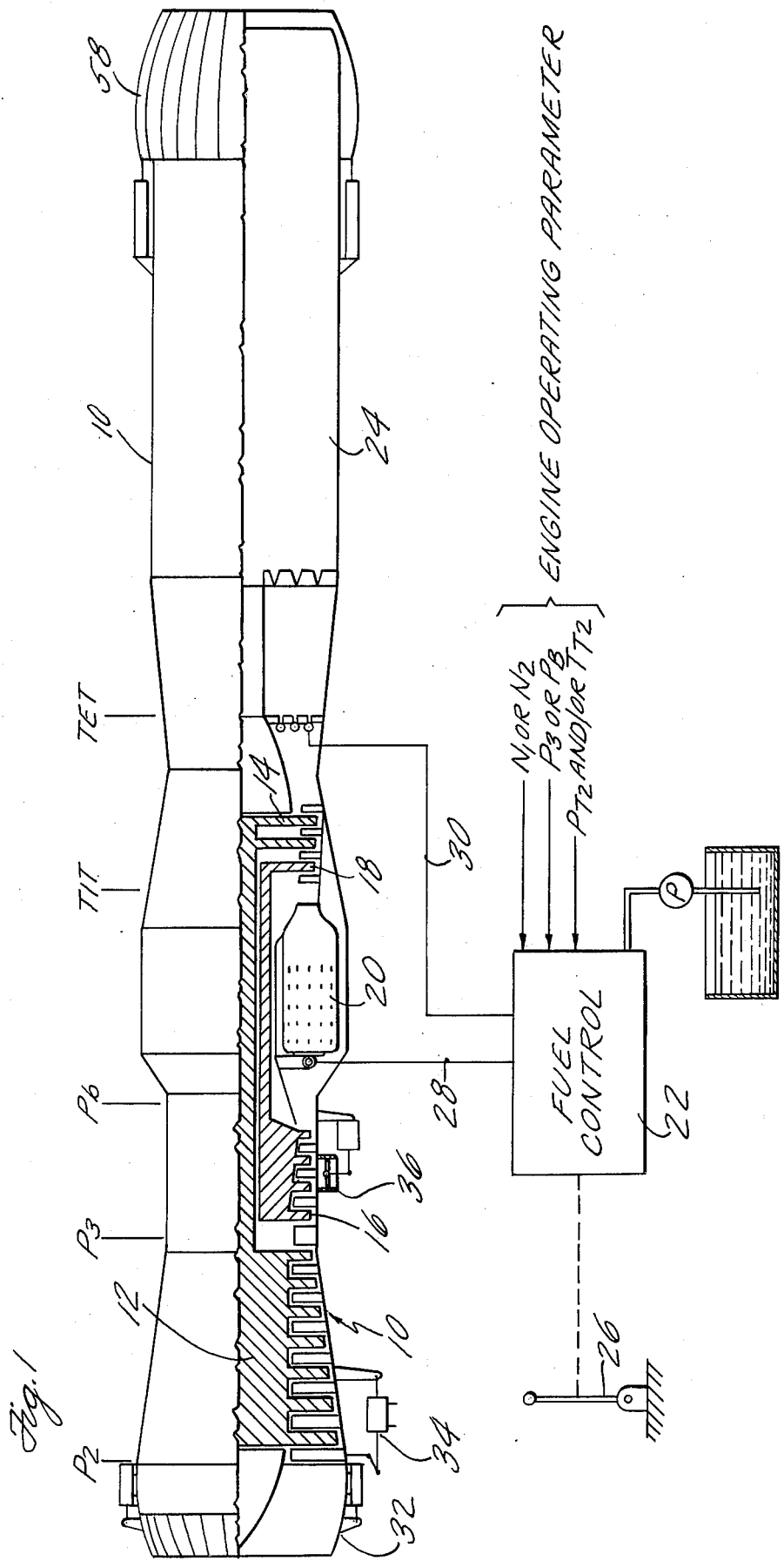
FIG. 1 is a schematic representation, partially in section of a gas turbine engine.

For the purpose of this description, the gas turbine engine illustrated in FIG. 1 typifies any number of different types of engines where this invention may be utilized. Such engines may include, as for example, the JT-3D, JT-8D, JT-9D, JT-12, TF-30 manufactured by the Pratt & Whitney Aircraft Division of United Technologies Corporation, but are not limited thereto. Suffice it to say that this invention is applicable where stall is a problem which is generally the case in any axial flow compressor. Also, the fuel control for the purpose of this invention may include any type, be it electronic, hydromechanical or the like that serves to meter fuel to the engine. Such fuel controls may include, for example, the JFC-12, JFC-25, JFC-60, JFC-68 manufactured by the Hamilton Standard Division of United Technologies Corporation or the AJ-H1, CJ-G5, CJ-G7, CJ-G8 manufactured by the Bendix Energy Controls Division of the Bendix Corporation but are not limited thereto.

Essentially, the gas turbine engine exemplified by FIG. 1 is a twin spool axial flow gas turbine engine having an engine casing 10 in which the low pressure compressor 12 and driving turbine 14 and high pressure compressor 16 and its driving turbine 18 are rotary mounted. The burner section 20 burns fuel metered thereto by fuel control illustrated by the block 22 and the generated gases after driving the turbines are exhausted to the afterburner 24 which may or may not be included. In this scheme fuel control 22 which responds to power lever 26 and other engine operating parameters in a well known manner supply fuel through lines 28 and 30 to the burner section of the core engine and the afterburner.

Depending on the particular engine and its application it may include a variable geometry inlet duct 32, variable compressor stators generally illustrated by reference numeral 34, and/or compressor bleeds, generally illustrated by reference numeral 36.

Figure 2:
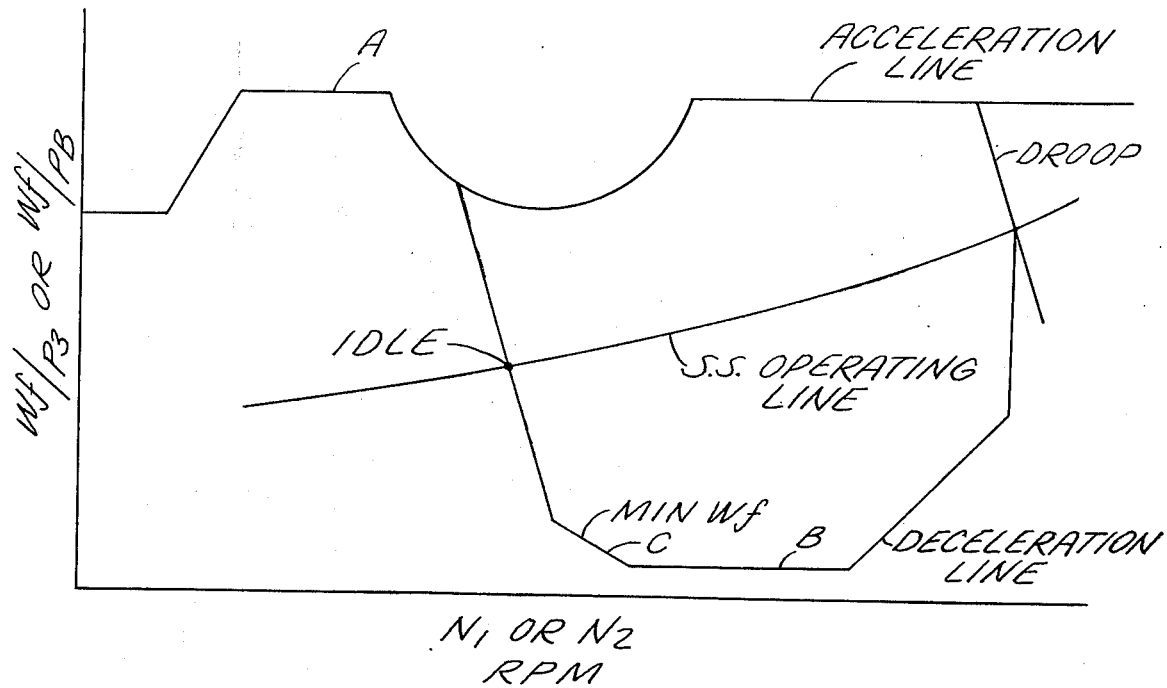
FIG. 2 is a graphical representation, showing a gas turbine engine operating line and control scheduling.

A typical fuel control, as those mentioned above, or the one described in U.S. Pat. No. 2,822,666 granted to S. G. Best and assigned to the same assignee, all of which are incorporated by reference herein, sense certain control parameters and compute them so as to manifest the control schedules depicted by the graph in FIG. 2. As noted, this graph which is a plot of $W_f/P_3$ or $W_f/P_B$ vs. $N_1$ or $N_2$ shows the acceleration line A which serves to prevent the engine from exceeding a predetermined temperature to assure that the engine parts will not exceed their temperature limits, and that the compressor will not operate in the surge region. Also, the control provides the typical deceleration schedule and the minimum $W_f$ represented by the lines B + C, respectively.

In the fuel controls noted above, the acceleration schedule is produced by a three-dimensional cam that responds in one direction to speed of the compressor and in another direction to compressor inlet temperature. The minimum $W_f$ is generally manifested by a stop which prevents the main fuel metering valve from closing-off. Since the pressure drop across the metering valve is held constant, the fuel flow, when on the stop, will be constant.

Figure 3:
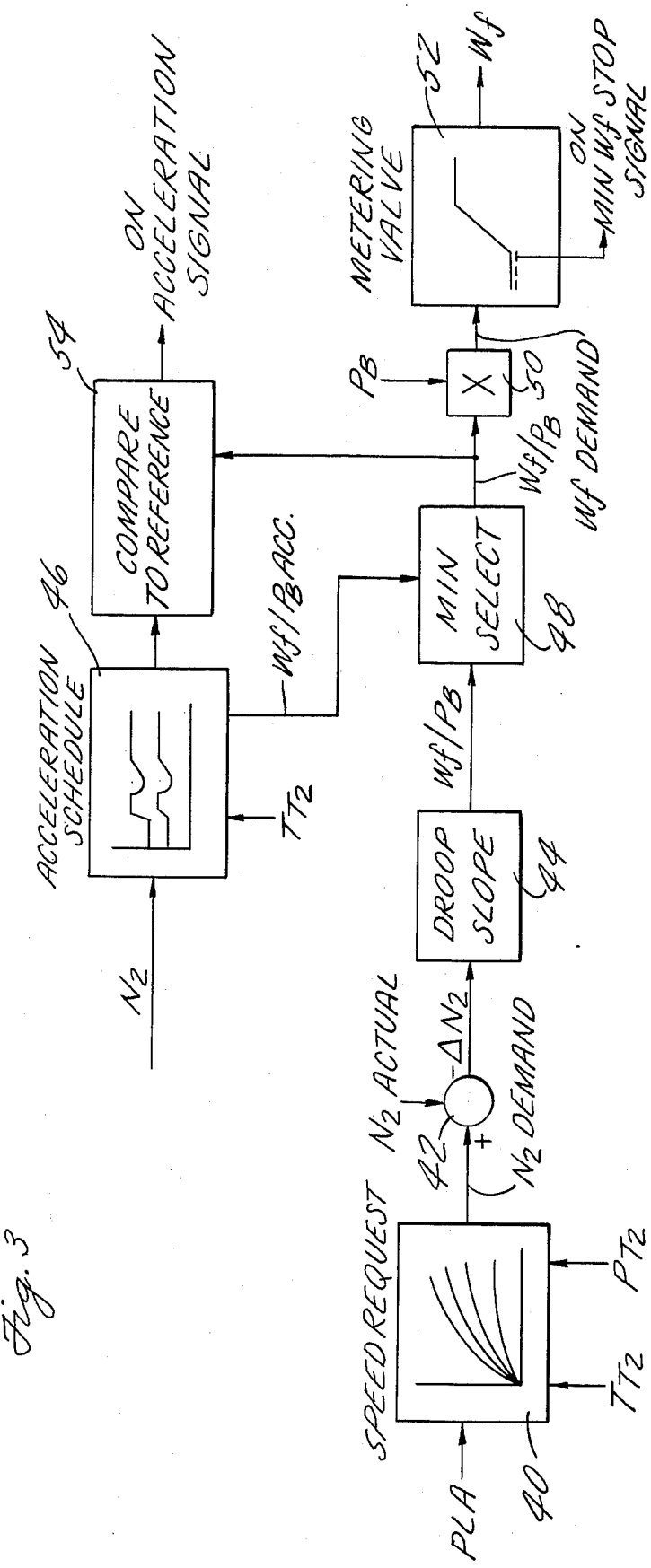
FIG. 3 is a block diagram typifying a fuel control system for providing the control according to the schedule of FIG. 2.

This best can be seen by referring to FIG. 3 which shows by block diagram the major functions of a typical $W_f/P_B$ type of fuel control. As noted, the speed request function generator 40 responding to the position of the power lever 26 (PLA) which may be biased by total compressor inlet temperature ($T_{T2}$) and/or total compressor inlet pressure ($P_{T2}$) produces a compressor speed (high compressor $N_2$) demand signal. Comparator 42 compares the actual $N_2$ and produces a delta ($\Delta$) $N_2$ signal indicative of the difference between the demand and actual.

While the controls mentioned above are droop governing this is not a limitation, as isochronous governing may be equally employed without affecting the invention. The gain or droop of the signal produced by the governor and illustrated by box 44 produces an output signal that is related in terms of a $W_f/P_3$ schedule signal. This corresponds to the abscissa of the graph illustrated in FIG. 2.

Concomitantly, the computing section of the fuel control monitoring $N_2$ and $T_{T2}$ produces an acceleration schedule 46 and as mentioned above in the case of the hydromechanical controls noted above this is the function of the three-dimensional cam. Both the steady-state $W_f/P_3$ represented by the output of droop slope 44 and the scheduled $W_f/P_3$ acceleration represented by the output of 46 are passed through the minimum selector 48 allowing the lower of the two to pass to the multiplier 50.

Multiplier 50 in a well known manner multiplies either the $W_f/P_B$ droop signal or $W_f/P_B$ acceleration signal by actual $P_B$ to produce a $W_f$ demand signal. The $W_f$ demand signal, in turn, positions the metering valve 52 to meter the amount of fuel dictated by the computer of the fuel control. As noted in box 52 the travel of fuel metering valve is limited by a stop represented by the dash line E.

The description above for both a typical engine and a typical fuel control do not form a part of this invention, except for the fact that existing components may be utilized to execute this invention. Hence, a detailed description of both the engine and fuel control are omitted for the sake of convenience and simplicity, but for further details reference should be made to the literature of the engine and the fuel controls already mentioned herein.

Figure 4:
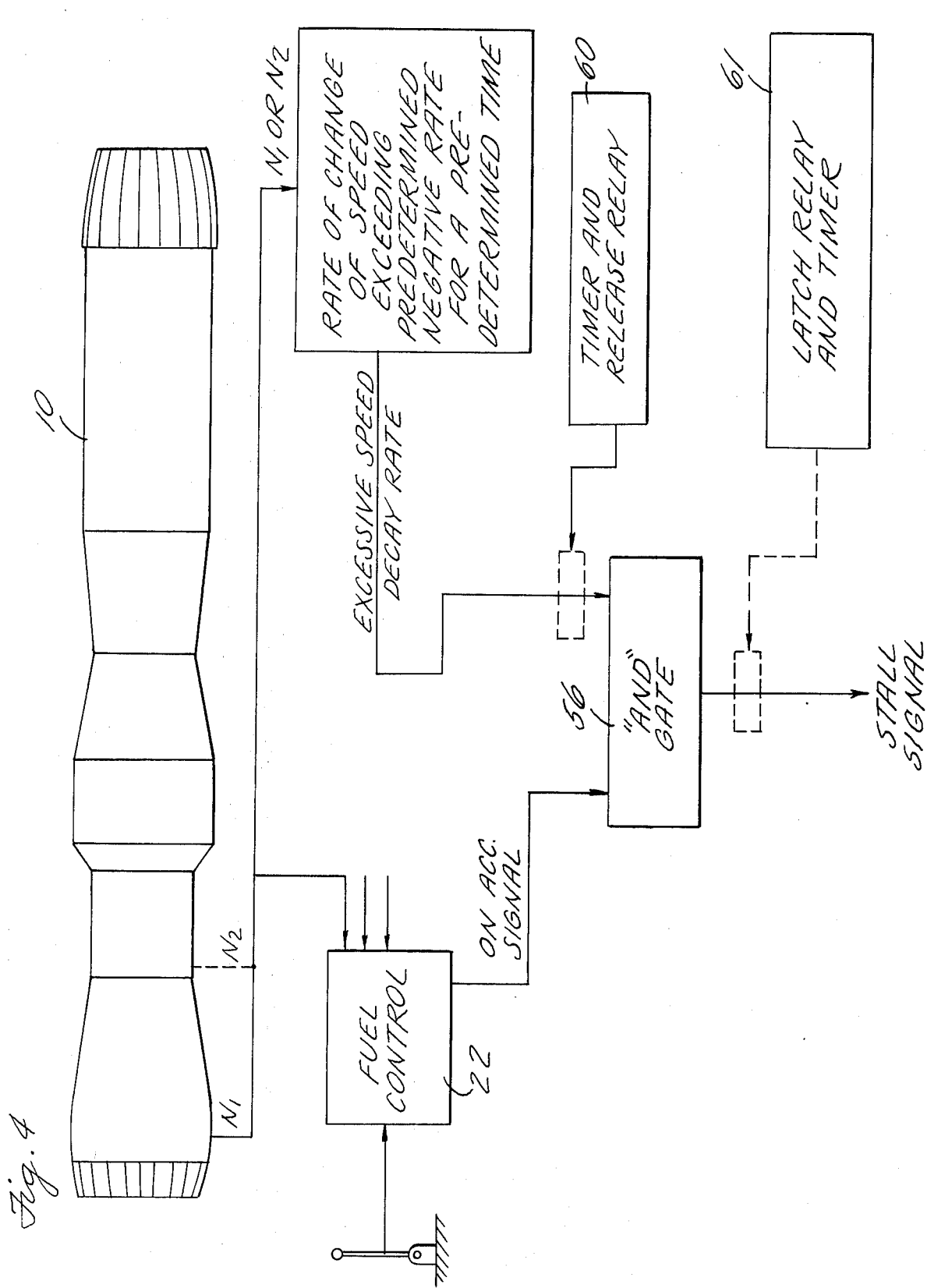
FIG. 4 is a schematic representation of a stall warning system connected to a typical gas turbine engine.

According to one aspect of this invention surge is detected by comparing the acceleration schedule to a reference value as represented by the box 54 of FIG. 3 which reference is generated by sensing the $W_f/P_B$ demand signal and producing an acceleration signal whenever the control is on the acceleration line or say up to 3 $W_f/P_B$ units away. In a hydromechanical fuel control this can be the distance the follower of the three dimensional cam is spaced away from the cam profile. As can be seen in FIG. 4 the on acceleration signal is fed to an "AND" gate represented by box 56. Suitable speed sensors which are well known provide either an $N_1$ or $N_2$ signal which is computed by a suitable computer, also well known, to measure its rate of change. This signal can then be utilized as another input to "AND" gate 56 such that when there is an excessive speed decay rate and the fuel control is near the acceleration schedule an output signal will emit from the "AND" gate which signal is indicative of imminent stall.

This signal may be utilized in a number of ways. Namely, it can be processed to actuate a warning signal available to the aircraft pilot. Also it can be utilized to change inlet geometry 32, open bleeds 36, change stator angle of stator 34, change outlet geometry 58 and either de-rich fuel or shut it off.

Under certain engine operating conditions, such as a "Bodie" when the engine control is on the accelerating schedule, it may be desirable to hold the speed decay rate signal a predetermined time before passing to the "AND" gate. "Bodie" is defined as a rapid time power level transient as where the power lever is retarded and then put into an acceleration demand position before the engine has had time to reach the steady state condition.

This can be easily accommodated by incorporating the timer and release relay mechanism and holding the relay a predetermined time. Any commercially available timer and release relay mechanism represented by box 60 could serve this purpose.

Also it may be desirable to hold the stall signal a predetermined time so as to prevent, for example, the stall signal from deactivation if for instance the power lever is pulled to idle or cut off or speed decay rate stabilizes. A suitable commercially available timer and release mechanism schematically represented by box 61 serves this purpose.

Referring to FIG. 5 where like reference numerals designate previously described elements, the "AND" gate 56 responds to the on acceleration signal from fuel control 22 and the rate of change of $P_3$ or $P_B$. Hence when computer 70 produces a signal from the monitored $P_3$ or $P_B$ which indicates an excessive pressure decay rate and the fuel control is on or near the accelerating schedule line the "AND" gate will produce an output signal indicating a stall. Relays and timer boxes 60 and 61 of FIG. 4 also may be incorporated in this system if need be.

FIG. 6 depicts another embodiment where the acceleration schedule is sensed as a stall warning parameter and with a compressor rise signal produces a stall warning signal whenever the fuel control is on or close to acceleration schedule and $P_3/P_2$ or $P_B/P_2$ are below a predetermined value. Hence "AND" gate 56 receives inputs when the control is on the acceleration signal and when a predetermined low level of the ratio of $P_3$ or $P_B$ to $P_2$ is computed. When both signals exist a stall warning signal will result. Suitable pressure probes monitor the pressure and ratio computer 74 produce an output whenever $P_3/P_2$ or $P_B/P_2$ goes below a predetermined level.

In the event the engine shuts off during flight and a restart is made it would be necessary to decouple the stall detector during this operation. Preferably this would be pilot operated by energizing suitable latching and unlatching mechanism represented by box 76.

By virtue of this invention stall detection is manifested by monitoring the acceleration schedule and producing an output signal indicative of when the fuel control is on or a predetermined distance from the acceleration schedule and monitoring another engine operating parameter and computing it so that whenever an excessive pressure decay rate or speed decay rate or a low $P_3/P_2$ or $P_B/P_2$ level is evidenced, a stall warning signal will be produced.

In certain engines the minimum fuel flow may be set too high under certain operating conditions and the stall signal may be utilized to re-set the minimum fuel flow to a lower value when the compressor is in stall. Otherwise, the amount of fuel permitted by the minimum fuel flow schedule before it was changed could cause the engine to overheat, even to an extent of burning it out.

It should be understood that the invention is not limited to the particular embodiments shown and described herein, but that various changes and modifications may be made without departing from the spirit or scope of this novel concept as defined by the following claims.

We claim:

1. Stall detector for a gas turbine engine having a compressor, burner and turbine, in combination with a fuel control having a fuel metering valve regulating the flow of fuel to the burner and independent coordinating means providing an acceleration schedule limiting said fuel metering valve, said stall detector including means responsive to said acceleration schedule for producing a first signal whenever said fuel control is on or near the acceleration schedule, means responsive to the rate of change of speed of said compressor for producing a second signal when the rate of speed decay exceeds a predetermined value and means responsive to both said first signal and said second signal for producing a third signal indicative of stall solely when said first signal and said second signal are received.

2. A stall detector as in claim 1 wherein the engine is of the twin spool design and the speed sensed is the low compressor speed.

3. A stall detector as claimed in claim 2 wherein the speed sensed is the high compressor speed.

4. A stall detector as claimed in claim 1 including means for holding for a predetermined time said second signal so as to admit said second signal to said means responsive to said first and second signals solely when a predetermined time lapses.

5. A stall detector as claimed in claim 1 including means for holding the output signal produced by said means responsive to said first signal and said second signal a predetermined time prior to its being utilized for a stall signal.

6. A stall detector as claimed in claim 1 including means for holding for a predetermined time said second signal prior to its input into said means responsive to said first signal and said second signal and means for holding the output of said means responsive to said first signal and said second signal a predetermined time so that the input and output of said means responsive to said first signal and second signal will be held a predetermined time before a stall signal will be manifested.

7. A stall detector as claimed in claim 1 wherein said fuel control includes means responsive to speed of said compressor and compressor inlet temperature for producing a scheduled signal indicative of desired acceleration of the engine, comparator means for comparing said scheduled signal with a reference signal to provide an output signal representative of when said fuel control is operating on or near the acceleration schedule.

8. A stall detector as claimed in claim 7 wherein said acceleration schedule signal is indicative of ratio unit of the fuel flow in pounds per hour and compressor discharge pressure in pounds per square inch absolute and means responsive to actual compressor discharge pressure for multiplying the acceleration schedule signal for regulating said fuel metering valve.

9. Stall detector for an axial flow gas turbine engine having a compressor, burner and turbine, in combination with a fuel control having a fuel metering valve regulating the flow of fuel to the burner and independent coordinating means providing an acceleration schedule limiting said fuel metering valve, said stall detector including means responsive to said acceleration schedule for producing a first signal whenever said fuel control is on or near the acceleration schedule, means responsive to the rate of change of pressure of said compressor for producing a second signal when the rate of pressure decay exceeds a predetermined value and gate means responsive to both said first signal and said second signal for producing an output signal indicative of stall solely when said first signal and said second signal are received.

10. A stall detector according to claim 9 wherein said axial flow engine is a twin spool type, and wherein said pressure is indicative of the pressure at the discharge end of the high compressor.

11. A stall detector according to claim 9 wherein said axial flow engine is a twin spool type and wherein said pressure is indicative of the pressure intermediate the high and low compressors.

12. A stall detector as claimed in claim 9 including means for holding for a predetermined time said second signal so as to admit said second signal to said gate means solely when a predetermined time lapses.

13. A stall detector as claimed in claim 9 including means for holding the output signal produced by said gate means a predetermined time prior to its being utilized for a stall signal.

14. A stall detector as claimed in claim 9 including means for holding for a predetermined time said second signal prior to its input into said gate means and means for holding the output of said gate means a predetermined time so that the input and output of said gate means will be held a predetermined time before a stall signal will be manifested.

15. A stall detector as claimed in claim 9 wherein said fuel control includes means responsive to speed of said compressor and compressor inlet temperature for producing a scheduled signal indicative of desired acceleration of the engine, comparator means for comparing said scheduled signal with a reference signal to provide an output signal representative of when said fuel control is operating on or near the acceleration schedule.

16. A stall detector as claimed in claim 15 wherein said acceleration schedule signal is indicative of ratio units of the fuel flow in pounds per hour to compressor discharge pressure in pounds per square inch absolute and means responsive to actual compressor discharge pressure for multiplying the acceleration schedule signal for regulating said fuel metering valve.

17. Stall detector for an axial flow gas turbine engine having a compressor, burner and turbine, in combination with a fuel control having a fuel metering valve regulating the flow of fuel to the burner and independent coordinating means providing an acceleration schedule limiting said fuel metering valve, said stall detector including means responsive to said acceleration schedule for producing a first signal whenever said fuel control is on or near the acceleration schedule, means responsive to inlet pressure of said compressor for producing a second signal, means responsive to compressor discharge pressure for producing a third signal and means responsive to both said second signal and said third signal for producing a fourth signal indicative of the ratio of said second and third signal, and gate means responsive to both the first signal when it is on or near the acceleration schedule and said fourth signal when it is below a predetermined value for producing an output signal indicative of a stall condition.

18. A stall detector as in claim 17 wherein the engine is of the twin spool design and wherein said third signal is the pressure at the discharge end of the low compressor.

19. A stall detector as claimed in claim 17 wherein said fuel control includes means responsive to speed of said compressor and compressor inlet temperature for producing a scheduled signal indicative of desired acceleration of the engine, comparator means for comparing said scheduled signal with a reference signal to provide an output signal representative of when said fuel control is operating on or near the acceleration schedule.

20. A stall detector as claimed in claim 17 wherein said acceleration schedule signal is indicative of ratio units of the fuel flow in pounds per hour and compressor discharge pressure in pounds per square inch absolute and means responsive to actual compressor discharge pressure for multiplying the acceleration schedule signal for regulating said fuel metering valve.

21. Stall detector in accordance with claim 17 including means for unlatching the output of said gate means to decouple the stall detector whenever the engine is stopped and the engine is restarted during a flight condition of the aircraft, and said means being controlled by the operator of the aircraft.

22. The method of detecting stall in an axial flow gas turbine engine that includes a compressor, turbine and burner and a fuel control that schedules the engine operation by including its acceleration, comprising the steps of:
measuring the schedule of the fuel control so as to produce an output signal whenever the fuel control is operating on the acceleration schedule,
measuring another parameter of engine operation of the compressor so as to produce an output signal whenever the other parameter is abnormal with respect to normal engine operation,
combining the outputs obtained in the steps of measuring so as to produce a signal indicative of stall solely when both signals are present which signal can then be used as a warning or to initiate correction action.

23. The method of detecting stall in an axial flow gas turbine engine that includes a compressor, turbine and burner and a fuel control that schedules the engine operation including scheduling its acceleration, comprising the steps of:
measuring the schedule of the fuel control so as to produce an output signal whenever the fuel control is operating on the acceleration schedule,
measuring the rotational speed of the compressor so as to produce an output signal whenever the rate of decay of that speed exceeds a predetermined value,
combining the outputs obtained in the steps of measuring so as to produce a signal indicative of stall solely when both signals are in existence, which signal can then be used as a warning or to initiate corrective action.

24. The method of claim 23 where the engine is a twin spool design and wherein the step of measuring includes sensing the low compressor speed.

25. The method of claim 23 where the engine is a twin spool design and wherein the step of measuring includes sensing the high compressor speed.

26. The method of detecting stall in an axial flow gas turbine engine that includes a compressor, turbine and burner and a fuel control that schedules the engine operation by including its acceleration, comprising the steps of:

measuring the schedule of the fuel control so as to produce an output signal whenever the fuel control is operating on the acceleration schedule, measuring the pressure of the air at or in proximity to the compressor so as to produce an output signal whenever the rate of decay of that pressure exceeds a predetermined value, combining the outputs obtained in the steps of measuring so as to produce a signal indicative of stall solely when both signals are present which signal can then be used as a warning or to initiate corrective action.

27. The method of claim 26 wherein the engine is a twin spool design and the pressure measured in the step of measuring is the pressure intermediate the low and high compressors.

28. The method of detecting stall in an axial flow gas turbine engine that includes a compressor, turbine and burner and a fuel control that schedules the engine operation by including its acceleration, comprising the steps of:

measuring the schedule of the fuel control so as to produce an output signal whenever the fuel control is operating on the acceleration schedule, measuring the pressure of the air at the inlet and its outlet of the compressor, dividing the values of the inlet and outlet pressures obtained in the step of measuring to obtain an output indicative of the ratio of these two pressures, combining the outputs obtained in the steps of measuring the schedule of the fuel control and dividing so as to produce a signal indicative of stall soley when both outputs are present which signal can then be used as a warning or to initiate corrective action.

* * * * *